United States Patent
Gafner

(10) Patent No.: US 10,914,522 B2
(45) Date of Patent: Feb. 9, 2021

(54) METHOD AND APPARATUS FOR REDUCING THE NOX EMISSIONS IN A ROTARY KILN

(71) Applicant: HOLCIM TECHNOLOGY LTD, Jona (CH)

(72) Inventor: Irwin Gafner, Rolle (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 107 days.

(21) Appl. No.: 15/758,191

(22) PCT Filed: Aug. 30, 2016

(86) PCT No.: PCT/IB2016/001220
§ 371 (c)(1),
(2) Date: Mar. 7, 2018

(87) PCT Pub. No.: WO2017/042615
PCT Pub. Date: Mar. 16, 2017

(65) Prior Publication Data
US 2018/0252473 A1    Sep. 6, 2018

(30) Foreign Application Priority Data
Sep. 8, 2015 (AT) .................................. 586/2015

(51) Int. Cl.
*F27B 7/20* (2006.01)
*C04B 7/36* (2006.01)
(Continued)

(52) U.S. Cl.
CPC ............ *F27B 7/2041* (2013.01); *C04B 7/364* (2013.01); *F23C 9/006* (2013.01); *F23K 3/02* (2013.01);
(Continued)

(58) Field of Classification Search
CPC .................................................... F27B 7/2041
See application file for complete search history.

(56) References Cited

U.S. PATENT DOCUMENTS 2,218,476 A * 10/1940 Newhouse .............. F27B 17/00
432/80
4,206,712 A *  6/1980 Vatsky .................... F23C 7/002
110/261
(Continued)

FOREIGN PATENT DOCUMENTS

CN    102713483 A    10/2012
DE    35 30 683 A1     3/1987
(Continued)

OTHER PUBLICATIONS

International Search Report as issued in International Patent Application No. PCT/IB2016/001220, dated Feb. 24, 2017.

*Primary Examiner* — Nathaniel Herzfeld
(74) *Attorney, Agent, or Firm* — Pillsbury Winthrop Shaw Pittman LLP

(57) ABSTRACT

In a method for reducing the NOx emissions of a rotary kiln of a clinker production plant, fuel supplied through a burner of the rotary kiln is burned along with primary air fed through the burner, wherein the primary air has a lower oxygen content and the primary air has an oxygen content reduced relative to that of the ambient air and a temperature increased relative to that of the ambient air, and the primary air is obtained by mixing ambient air with exhaust gas from the rotary kiln or from a heat exchanger connected to the rotary kiln and used for preheating raw meal. The primary air is further obtained by mixing with hot air, in particular waste air from a clinker cooler.

19 Claims, 1 Drawing Sheet

(51) Int. Cl.
  *F27B 7/36* (2006.01)
  *F27D 17/00* (2006.01)
  *F23K 3/02* (2006.01)
  *F23L 7/00* (2006.01)
  *F27B 7/00* (2006.01)
  *F23C 9/00* (2006.01)
  *F23D 99/00* (2010.01)

(52) U.S. Cl.
  CPC .................. *F23L 7/00* (2013.01); *F27B 7/00* (2013.01); *F27B 7/36* (2013.01); *F27D 17/008* (2013.01); *F23C 2202/30* (2013.01); *F23D 99/00* (2013.01); *Y02P 40/121* (2015.11)

(56) References Cited

U.S. PATENT DOCUMENTS

| | | | | |
|---|---|---|---|---|
| 4,223,615 A | * | 9/1980 | Breen | F23D 1/02 110/264 |
| 4,310,298 A | * | 1/1982 | Abelitis | B02C 21/00 110/347 |
| 4,315,734 A | * | 2/1982 | Ramesohl | B02C 21/00 110/232 |
| 4,387,654 A | * | 6/1983 | Binasik | C21B 13/08 110/106 |
| 4,475,466 A | * | 10/1984 | Gravely | F23G 5/446 110/238 |
| 5,972,104 A | * | 10/1999 | Doumet | C04B 7/02 106/739 |
| 6,146,133 A | * | 11/2000 | Erhard | C04B 7/4423 106/771 |
| 6,347,937 B1 | * | 2/2002 | Yearham | F23C 7/002 110/265 |
| 2002/0172907 A1 | * | 11/2002 | Tseng | C04B 7/434 432/14 |

FOREIGN PATENT DOCUMENTS

| | | |
|---|---|---|
| EP | 0 534 225 A1 | 3/1993 |
| GB | 1 107 425 A | 3/1968 |

\* cited by examiner

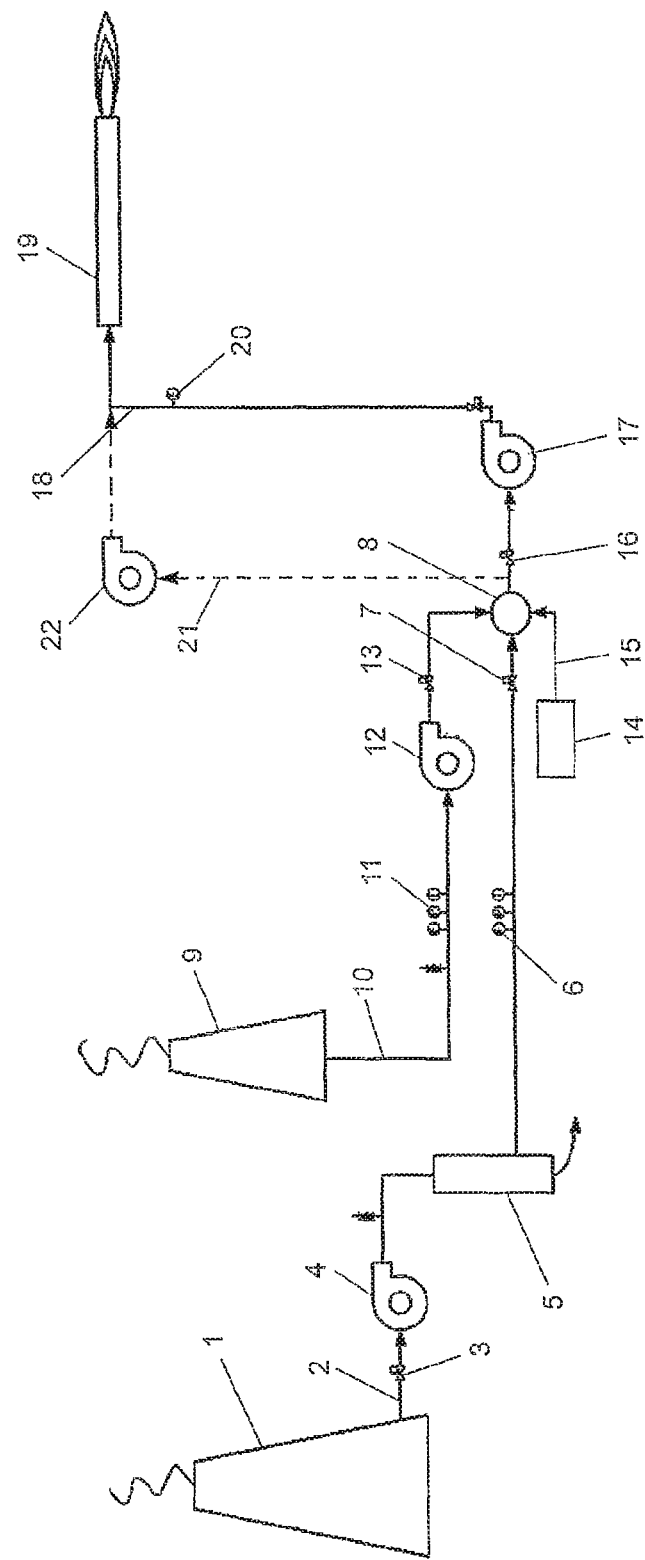

METHOD AND APPARATUS FOR REDUCING THE NOX EMISSIONS IN A ROTARY KILN

CROSS-REFERENCE TO RELATED APPLICATIONS

This application is the U.S. National Stage of International Application Serial No. PCT/IB2016/001220, filed Aug. 30, 2016, which in turn claims priority to Austrian Application No. A 586/2015, filed Sep. 8, 2015. The contents of all of these applications are incorporated herein by reference in their entirety.

The invention relates to a method for reducing the NOx emissions of a rotary kiln of a clinker production plant, in which fuel supplied through a burner of the rotary kiln is burned along with primary air fed through the burner and the primary air has an oxygen content reduced relative to that of the ambient air and a temperature increased relative to that of the ambient air, the primary air being obtained by mixing ambient air with exhaust gas from the rotary kiln or from a heat exchanger connected to the rotary kiln and used for preheating raw meal.

The invention further relates to a device for carrying out such a method.

A method of the initially defined kind is described in DE 3530683 A1.

The production of cement clinker predominantly takes place in a rotary kiln with a preceding cyclone heater and a consecutively arranged clinker cooler.

The raw meal is heated and precalcined in the heat exchanger and converted to clinker in the kiln at temperatures ranging between about 900° C. at the kiln inlet and about 1,450° C. in the sintering zone. The temperature of the combustion gases required for the formation of the clinker minerals is up to 2,200° C. During the process, nitrogen oxides are formed, which can be reduced by primary or secondary measures. Primary measures aim to reduce the formation of nitrogen oxides. Secondary measures aim to remove the formed nitrogen oxides by catalytic or non-catalytic methods.

For reasons of reducing the load on the environment, various legal provisions impose emission limit values for nitrogen oxides. At present, the imposed emission limit values range between 200 and 800 mg Nox/Nm³.

Secondary measures for NOx reduction include the selective catalytic reduction (SCR) and the selective non-catalytic reduction (SNCR) of exhaust gases. The chemical reaction is selective so as to preferably reduce the nitrogen oxides (NO, $NO_2$), while largely suppressing undesired side reactions such as the oxidation of sulfur dioxide to sulfur trioxide. For the reaction, an ammonia component (e.g. ammonia ($NH_3$), urea ($CH_4N_2O$) or the like) is required, which is admixed to the exhaust gas. The products from the reaction are water ($H_2O$) and nitrogen ($N_2$). The secondary measures, however, involve increased operating costs and may result in the exhaust gas containing ammonia.

The method proposed in DE 3530683 A1 for the primary reduction of NOx is based on reducing the oxygen content of the primary gas supplied to the burner. The thermal NOx formation is thereby reduced. Moreover, the primary gas is supplied at elevated temperature to compensate for the reduced oxygen content. As primary gas, exhaust gas from the rotary kiln or from the heat exchanger, optionally mixed with ambient air, is used.

That method faces the problem of adjusting the optimum temperature level and the oxygen content of the primary gas.

The temperature and the oxygen content are of vital importance for the combustion process and hence for the quality of the obtained clinker, wherein, in particular, conditions as constant as possible also have to be ensured. At too high a temperature of the primary gas, the effect of NOx reduction would no longer be sufficiently guaranteed. Too low a temperature would, in turn, lead to an acid condensation of the sulfur contained in the recirculated exhaust gas, which would result in corrosion problems. As regards the oxygen content, optimization is necessary to the effect that a compromise between too low a content, in which case the combustion process will be inefficient, and too high a content, in which case the extent of NOx reduction will be too low, has to be found.

In addition, specified values of the overall volume flow of the primary gas also have to be observed in order to optimize the combustion process.

It is thus desirable that, in the context of the recirculation of the exhaust gas for the purpose of NOx reduction, specified temperature, oxygen content and volume flow values are controlled and maintained as precisely and consistently as possible. This is only insufficiently possible by the method according to DE 3530683 A1, because the oxygen content and the temperature of the primary air cannot be adjusted independently of each other. Although, for instance, an increase in the portion of the recirculated exhaust gas in the primary gas leads to a decrease of the oxygen content to a desired extent as a function of the mixing ratio, it will, at the same time, also cause a change in the temperature by a value that is not freely selectable. Moreover, natural fluctuations of the temperature of the ambient air and of the exhaust gas lead to uncontrolled changes in the temperature of the primary gas.

The present invention, therefore, aims to improve the method of exhaust gas recirculation to the effect that the temperature and the oxygen content of the primary gas, and optionally the volume flow, can be adjusted as mutually independently as possible in order to achieve a sufficient NOx reduction at the simultaneous optimization of the combustion conditions.

To solve this object, the invention in a method of the initially defined kind substantially provides that the primary air is further obtained by mixing with hot air, in particular waste air from a clinker cooler. In that, in addition to ambient air and exhaust gas, a third air flow, i.e. hot air, is admixed if required, it has become possible to adjust the temperature and the oxygen content of the primary gas largely independently of each other by selecting a suitable mixing ratio. By providing a third control parameter, the adjustment of the desired properties of the primary gas has been facilitated within broader ranges than in the prior art, even under fluctuating environmental conditions.

Hot air in this respect is meant to denote air that has a higher temperature than ambient air, the use of waste air from a clinker cooler being preferred. The hot air preferably has a temperature ranging between or above the temperature of the exhaust gas and that of the ambient air.

A preferred method control provides that the mixing ratio of ambient air, exhaust gas and hot air is controlled such that the primary gas is fed to the burner at a temperature of 50-250° C., in particular 100-150° C., and an oxygen content of 8-18% by vol., in particular 13-16% by vol. The volume flows of ambient air, exhaust gas and hot air are thus selected, and adapted to one another, such that the desired primary gas properties are achieved. To this end, the temperature and the oxygen value of the primary gas are measured by sensors either continuously or at regular time intervals as directly as possible before its entry into the burner, and fed to a controller, in which suitable values for the volume flows are calculated and control commands for respective control units disposed in the feed lines are generated. In doing so, the controller takes into account the temperatures and oxygen contents of the available ambient air, the exhaust gas and the hot air. On the other hand, characteristics of the control path between the point of mixing of the individual volume flows and the point of measurement sensing at the entry of the primary gas upstream of the burner are taken into consideration, such as an increase in the pressure and hence temperature by a main fan disposed there.

It was found that the observance of the above-defined values for the temperature and the oxygen content of the primary gas constitute an ideal compromise between the contradictory requirements of a sufficient reduction of the NOx values, on the one hand, and the guarantee of an efficient combustion process in the rotary kiln, the economy of the kiln operation and the adherence to good quality of the clinker, on the other hand.

Advantageously, the overall volume flow of the primary gas can be used as a further control variable. The method in this context is preferably performed such that the mixing of ambient air, exhaust gas and hot air is controlled to maintain a volume flow of primary gas adapted to the process.

As regards the temperatures of the individual partial flows of the primary gas, the following values are preferred. The hot air can be used at a temperature of 80-150° C., such a temperature level being achievable in a simple manner by using the waste air from the clinker cooler. The exhaust gas to be recirculated is preferably used at a temperature of 100-200° C.

In a preferred manner, it is further provided that exhaust gas with an oxygen content of 6-10% by vol. is used.

In the context of the invention, the sum of all delivery flows supplied to the combustor through the burner of the rotary kiln is considered as primary air. The burner in question is, in particular, the burner for the main firing system of the rotary kiln. Such burners, as a rule, comprise a plurality of channels for primary gas, in particular at least one channel for providing the swirl component of the primary gas and at least one channel for feeding the axial component of the primary gas. In addition, the primary air includes the delivery air volume for the fuel feed. The air supplied to the combustor outside the burner, e.g. laterally of the burner, is referred to as secondary air.

The major portion of the combustion air volume is supplied via the secondary air. In the context of the invention, it is preferably provided that 5-20% by vol. of the combustion air is fed to the rotary kiln as primary gas, and 80-95% by vol. of the combustion air is supplied as secondary gas.

According to a further aspect, the invention relates to a device for carrying out the above-described method, comprising a rotary kiln with a burner, a heat exchanger connected to the rotary kiln on the exhaust-gas side and optionally including a calciner, and a clinker cooler, wherein a primary gas supply for the burner with a main fan is provided, wherein a mixing device including an ambient air supply, an exhaust gas supply fed with the exhaust gas from the heat exchanger, and a hot air supply fed with the waste air from the clinker cooler are disposed upstream of the main fan.

It is preferably provided that the ambient air supply, the exhaust gas supply and the hot air supply are each equipped with a control element for controlling the respective volume flow, wherein the control elements are connected to a control device to which measurements of a temperature sensor and oxygen-content sensor disposed downstream of the main fan are fed, wherein the control device is arranged to adjust the control elements such that a specified temperature of preferably 50-250° C., in particular 100-150° C., and a specified oxygen content of preferably 8-18% by vol., in particular 13-16% by vol., of the primary gas supplied to the burner are maintained.

Furthermore, it is preferably provided that the control device is arranged to adjust the control elements such that a specified volume flow of the primary gas supplied to the burner is maintained.

In the following, the invention will be explained in more detail by way of an exemplary embodiment schematically illustrated in the drawing. FIG. 1 depicts a stack 1 for discharging exhaust gas from a heat exchanger of a preheater for raw meal. Exhaust gas is branched off from the stack 1 via a duct 2, the branched-off volume flow being adjustable via a control element 3. The fan for withdrawing the exhaust gas is denoted by 4. The exhaust gas is preferably conducted through a condenser 5, in which water is removed from the exhaust gas, which water can subsequently be recycled. The oxygen content, the temperature, and optionally the pressure, of the exhaust gas are measured by sensors 6, a further control element for adjusting the volume flow being denoted by 7. The exhaust gas is subsequently fed to a mixing chamber 8. To the mixing chamber 8 is further supplied waste air from the stack 9, said waste air being waste air from the clinker cooler. The waste air is conducted via a duct 10 and a fan 12. The temperature, and optionally the pressure, of the waste air are determined by sensors 11. The volume flow of the waste air can be adjusted by means of a control element 13.

Furthermore, ambient air 14 is supplied to the mixing chamber 8 via a duct 15.

The mixture of ambient air, exhaust gas and waste air is supplied to the burner 19 of the rotary kiln as primary gas via a fan 17 and a duct 18. A portion of the primary gas can be fed as transport gas to respective fuel metering units via a duct 21 and a fan 22. A control element 16 is provided for adjusting the volume flow of the primary gas. At the measuring point 20, the temperature, the oxygen content, the pressure and the volume flow of the primary gas are measured and compared to set points in a control device not illustrated. In the event of a deviation from the set points, the control device cooperates with the control elements 3, 7, 13 and a control element (not illustrated) for adjusting the amount of ambient air in order to effect a correction.

The invention claimed is:

1. A method for reducing the NOx emissions of a rotary kiln of a clinker production plant, in which fuel supplied through a burner of the rotary kiln is burned along with primary air fed through the burner and the primary air has an oxygen content reduced relative to that of ambient air and a temperature increased relative to that of the ambient air, the primary air being obtained by mixing the ambient air with exhaust gas from the rotary kiln or from a heat exchanger connected to the rotary kiln and used for preheating raw meal, wherein the primary air is further obtained by mixing with hot air, wherein the ambient air, the exhaust gas and the hot air are separately supplied to a mixing chamber to mix them and form the primary air, and wherein said primary air formed by a mixture of the ambient air, the exhaust gas and the hot air is fed to the burner.

2. The method according to claim 1, wherein the mixing ratio of ambient air, exhaust gas and hot air is controlled such that the primary gas is fed to the burner at a temperature of 50-250° C. and an oxygen content of 8-18% by vol.

3. The method according to claim 1, wherein the mixing of ambient air, exhaust gas and hot air is controlled to maintain a volume flow of primary gas adapted to the process.

4. The method according to claim 1, wherein hot air is used at a temperature of 80-150° C.

5. The method according to claim 1, wherein exhaust gas is used at a temperature of 100-200° C.

6. The method according to claim 1, wherein exhaust gas with an oxygen content of 6-10% by vol. is used.

7. The method according to claim 1, wherein 5-20% by vol. of primary gas, and 80-95% by vol. of secondary gas, are fed to the rotary kiln.

8. The method according to claim 1, wherein a portion of the primary gas is used as transport gas for fuels.

9. A device for reducing NOx emissions of a clinker production plant, the device comprising a rotary kiln with a burner, a heat exchanger connected to the rotary kiln on the exhaust-gas side, and a clinker cooler, wherein a primary gas supply for supplying primary gas to the burner with a main fan is provided, wherein fuel supplied through the burner of the rotary kiln is burned along with the primary gas fed through the burner and the primary gas has an oxygen content reduced relative to that of the ambient air and a temperature increased relative to that of the ambient air,
wherein a mixing device including an ambient air supply, an exhaust gas supply fed with the exhaust gas from the heat exchanger, and a hot air supply fed with the waste air from the clinker cooler are disposed upstream of the main fan,
wherein the ambient air supply, the exhaust gas supply and the hot air supply are each equipped with a control element for controlling the respective volume flow, wherein the control elements are connected to a control device to which measurements of a temperature sensor and oxygen-content sensor disposed downstream of the main fan are fed, wherein the control device is arranged to adjust the control elements such that a specified temperature and a specified oxygen content of the primary gas supplied to the burner are maintained.

10. The device according to claim 9, wherein the control device is arranged to adjust each control element such that a specified volume flow of the primary gas supplied to the burner is maintained.

11. The method according to claim 1, wherein the hot air is waste air from a clinker cooler.

12. The method according to claim 2, wherein the mixing ratio of ambient air, exhaust gas and hot air is controlled such that the primary gas is fed to the burner at a temperature of 100-150° C.

13. The method according to claim 2, wherein the oxygen content is of 13-16% by vol.

14. The method according to claim 4, wherein hot air is used at a temperature of 90-100° C.

15. The method according to claim 5, wherein exhaust gas is used at a temperature of 145-185° C.

16. The method according to claim 6, wherein exhaust gas with an oxygen content of 6-8% by vol. is used.

17. The device according to claim 9, wherein the specified temperature is 50-250° C. and the specified oxygen content is 8-18% by vol.

18. The device according to claim 17, wherein the specified temperature is 100-150° C.

19. The device according to claim 17, wherein the specified oxygen content is 13-16% by vol.

* * * * *